United States Patent [19]
Bigo

[11] Patent Number: 5,760,948
[45] Date of Patent: Jun. 2, 1998

[54] METHOD OF REGENERATING A SOLITON SIGNAL USING AN ALL OPTICAL DOUBLER

[75] Inventor: Sébastion Bigo, Palaiseau, France

[73] Assignee: Alcatel N.V., Rijswijk, Netherlands

[21] Appl. No.: 713,486

[22] Filed: Sep. 13, 1996

[30] Foreign Application Priority Data

Sep. 14, 1995 [FR] France ................... 95 10763

[51] Int. Cl.$^6$ ........................................... G02F 1/39
[52] U.S. Cl. .............................. 359/326; 385/5
[58] Field of Search ..................... 359/326–332; 385/5, 15, 16, 24; 372/18

[56] References Cited

U.S. PATENT DOCUMENTS

| | | | |
|---|---|---|---|
| 5,144,375 | 9/1992 | Gabriel et al. | 385/16 X |
| 5,517,346 | 5/1996 | Eckstein et al. | 359/326 X |
| 5,548,433 | 8/1996 | Smith | 372/18 X |
| 5,619,368 | 4/1997 | Swanson | 359/326 |

OTHER PUBLICATIONS

M. Nakazawa et al, "80GBIT/S Soliton Data Transmission Over 500KM With Unequal Amplitude Solitons For Timing Clock Extraction", *Electronics Letters*, vol. 30, No. 21, Oct. 13, 1994, pp. 1777/1778–1778.

S. Kawanish et al, "64 To 8 GBIT/S All–Optical Demultiplexing Experiment With Clock Recovery Using New Phase Loop Technique", *Electronics Letters*, vol. 29, No. 2 Jan. 21, 1993, pp. 231–233, GB.

K. Uchiyama et al, "Effects Of Control–Signal Pulse Walk–Off On BER Performance Of Nonlinear Optical Loop Mirror Demultiplexer", *Electronics Letters*, vol. 29, No. 15, Jul. 22, 1993, GB, pp. 1313–1314.

S. Kawanishi et al, "100 GBIT/S Transmission Using All Optical Circuits", *IEICE Transactions On Communications*, vol. E77–B, No. 4, Apr. 1994, Tokyo, JP, pp. 441–448.

*Primary Examiner*—John D. Lee
*Attorney, Agent, or Firm*—Sughrue, Mion, Zinn, Macpeak & Seas, PLLC

[57] ABSTRACT

The frequency of a first optical clock signal that is approximately sinusoidal and has a frequency $f_0$ is doubled by all-optical means. A non-linear optical loop mirror (NOLM) is used as an optical modulator, being controlled by the first clock signal at $f_0$ to modulate a continuous second signal introduced at the signal input of the NOLM. The modulated signal at the frequency $2f_0$ is recovered at the output of the NOLM. Two wavelengths are advantageously used for the first and second signals, these two wavelengths having substantially the same group velocity in the NOLM. In an important implementation the peak-to-peak power of the first control signal is much less than the power needed to maximize the switching effect of the NOLM on the second signal. The invention also concerns a soliton regenerator using this optical doubling method. Applications include fiber optic telecommunications, in particular using solitons.

12 Claims, 5 Drawing Sheets

PRIOR ART

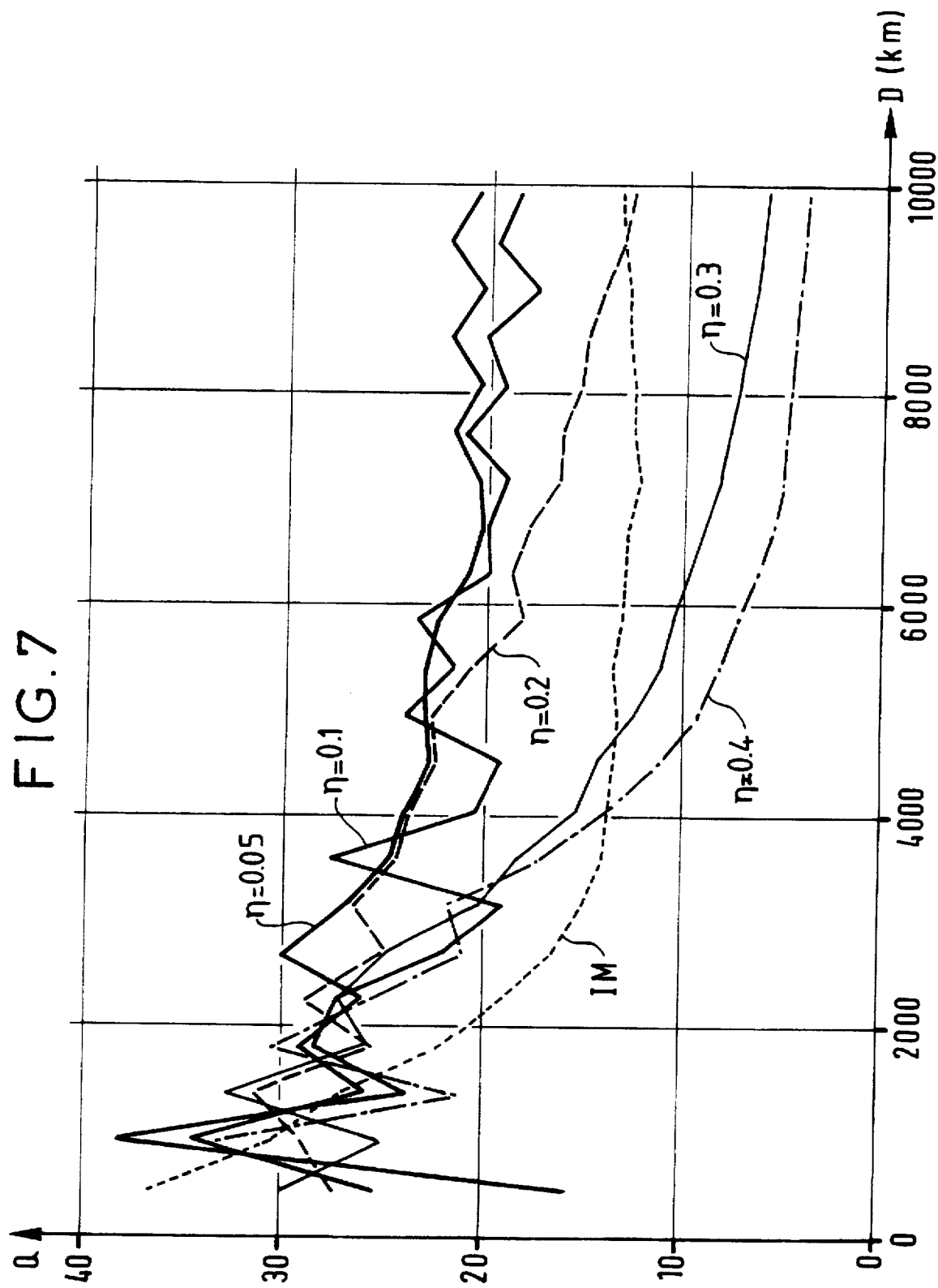

METHOD OF REGENERATING A SOLITON SIGNAL USING AN ALL OPTICAL DOUBLER

BACKGROUND OF THE INVENTION

1. Field of the Invention

The invention concerns the field of fiber optic telecommunications and in particular long-distance telecommunications.

2. Description of the Prior Art

A "soliton" type signal has been used for very long distance fiber optic links and has particular spectral properties that enable the signal to propagate along the dispersive fiber without significant chromatic dispersion, i.e. the dependence of the refractive index on the signal intensity is used to counterbalance the chromatic dispersion and vice versa. The spectral form of the signal is preserved despite the effects of the propagation distance, which are therefore mainly in the form of line losses. These line losses can be compensated by in-line optical amplification, for example using an erbium-doped fiber amplifier (EFDA).

The following problems remain to be solved for transmission using solitons with in-line (EDFA) amplification:

1) the Gordon-Haus jitter which causes temporal uncertainty in the arrival of the bits of the signal;

2) the accumulation of noise caused by amplified spontaneous emission (ASE) in the optical amplifiers.

These problems can be minimized by regenerating the solitons periodically along the link. Regeneration typically comprises optical amplification to compensate the line losses and any insertion losses of the regenerator device, clock recovery from the bit stream of the signal to be regenerated, synchronous modulation of the solitons using the recovered clock signal to eliminate the jitter, and filtering to eliminate the ASE noise and to re-center the solitons in their time window and restore their optical spectral form. A prior art regeneration system of this kind is described in document D1, for example, which is hereby incorporated by way of reference into the present application by way of description of the prior art:

1) Concerning the synchronous modulation with filtering, D1=H. Kubota and M. Nakazawa (1993) "Soliton transmission control in time and frequency domains", IEEE J. Quantum Electronics V.29, n° 7, pp. 2189–2197, July 1993 shows the theoretical benefit by the calculation of this method. No practical solution is recommended, but there is a reference to an experimental transmission at 10 Gbit/s over one million kilometers in D2=Nakazawa et al. (1993) "Experimental demonstration of soliton data transmission over unlimited distances with soliton control in time and frequency domains", Electronics Letters, v.29, n° 9, pp. 729–730, 29 Apr. 1993. This document D2 teaches the use of an $LiNbO_3$ optical modulator for synchronous modulation of the solitons.

There are two feasible clock recovery methods: those requiring extraction of a part of the optical signal and its conversion into an electronic signal and those that do not require opto-electronic conversion.

The first type of system is described in the previously mentioned document D2, for example, as shown diagrammatically in FIG. 1. The problem with this solution is that the bit rate of the signals to be regenerated cannot exceed 20 Gbit/s to 30 Gbit/s (10 Gbit/s in document D2) because of technological limits on the maximal speed of present day electronic circuits. In D2 an $LiNbO_3$ modulator is controlled by an electronic control signal generated in a clock circuit from the line soliton signal. The clock recovery means include an optical coupler C3 for extracting a part of the optical signal propagating between the input F1 and the output F2, a clock extractor circuit CLKX, a delay line DEL to insert a time-delay and an amplifier GM to supply the control power needed to operate the $LiNbO_3$ modulator MOD. FIG. 1 also shows an input optical amplifier (EDFA) to alleviate the insertion losses of the regenerator circuit, birefringent polarity control (PC) devices and a band-pass filter BP to narrow the spectral distribution of the energy of the solitons.

With reference to overcoming the limitations imposed on the maximal bit rate by the use of an electronic clock recovery circuit, the person skilled in the art is familiar with systems using multiplexing and demultiplexing to increase the bit rate on transmission and then to reduce a clock rate extracted from the signal bit stream at the receiving end. The clock can be extracted at 10 Gbit/s, for example, for compatibility with the electronics, and the frequency of this clock signal doubled before applying it to a modulator of a regenerator of a soliton signal having twice the bit rate, i.e. 20 Gbit/s.

Systems of this kind are described in the following documents, hereby incorporated explicitly into the present application by way of description of the prior art.

D3=Kawanishi, S. et al. "64 to 8 Gbit/s all optical demultiplexing with clock recovery using the new phase lock loop technique", Elect. Lett. 29 (2) p. 231 (1993), describes the extraction of an 8 GHz clock signal from a 64 Gbit/s bit stream for the purposes of demultiplexing using a phase-lock loop (PLL) including a travelling wave laser diode amplifier (TW-LDA).

D4=Kamatani, O. et al. "Prescaled 6.3 GHz clock recovery from 50 Gbit/s TDM optical signal with 50 GHz PLL using four-wave mixing in a travelling wave laser diode optical amplifier", Elect. Lett. 30 (10) p. 807 (1994), describes a similar system for extracting a clock at 6.3 GHz from a time-division multiplex (TDM) signal at 50 GHz using a PLL including a TW-LDA and based on the four wave mixing (FWM) effect.

To avoid the limitations of the electronics on doubling the frequency it would be advantageous to carry out electro-optical conversion before doubling optically. This requires an optical doubler for doubling the optical signal frequency.

SUMMARY OF THE INVENTION

To this end, the invention proposes a method of doubling the frequency $f_0$ of an approximately sinusoidal clock signal conveyed by an optical wave having a first peak-to-peak power $P_{cc}$ and a first wavelength $\lambda c$ to supply a modulated signal at the frequency $2f_0$ conveyed by an optical wave having a second wavelength $\lambda s$, comprising the following steps:

said clock signal at said frequency $f_0$ and having said first wavelength $\lambda c$ is introduced to the control input of a non-linear optical loop mirror, a continuous signal at said second wavelength $\lambda s$ is introduced at the signal input of said non-linear optical loop mirror and, said modulated signal at said frequency $2f_0$ conveyed by an optical wave having said second wavelength $\lambda s$ is collected at the output of said non-linear optical loop mirror, said first and second wavelengths having substantially the same group velocity Vg in said non-linear optical loop mirror.

In an advantageous embodiment, the value of the peak-to-peak power is made much less than the power of said clock signal required to maximize the switching effect of said non-linear optical loop mirror on said signal.

The invention also proposes a method of regenerating a soliton signal having a bit rate $f_s$ by synchronous modulation of said solitons at said frequency $f_s$, comprising the following steps:

extracting a sub-harmonic of said soliton signal having a frequency $$f_{sh}=f_s \cdot 2^{-i}$$

where i is a positive integer, optical doubling of said sub-harmonic frequency $f_{sh}$ according to the method of the invention: this step being repeated i times to supply a clock signal at the frequency $f_s$, applying said clock signal at the frequency $f_s$ to the control input of an optical modulator in order to modulate said soliton signal present at the signal input of said modulator, and collecting the soliton signal modulated as above at the output of said modulator.

The regeneration advantageously further comprises amplification and filtering steps known to the person skilled in the art.

In various embodiments of the regeneration method of the invention said sub-harmonic of the soliton signal can be extracted either electronically or optically.

The invention and its various features and advantages will be better understood from the following detailed description and the appended drawings.

BRIEF DESCRIPTION OF THE DRAWINGS

FIG. 7 shows the results of digital simulation of the quality factor Q as a function of the link length D for transoceanic distances and for various values of the control power $P_c$.

DETAILED DESCRIPTION OF THE PREFERRED EMBODIMENT

The drawings are given by way of non-limiting example to illustrate the principles of the invention and a few embodiments thereof. The same reference numbers refer to the same components in all the figures. For clarity the figures are not all to scale.

Figure 1:
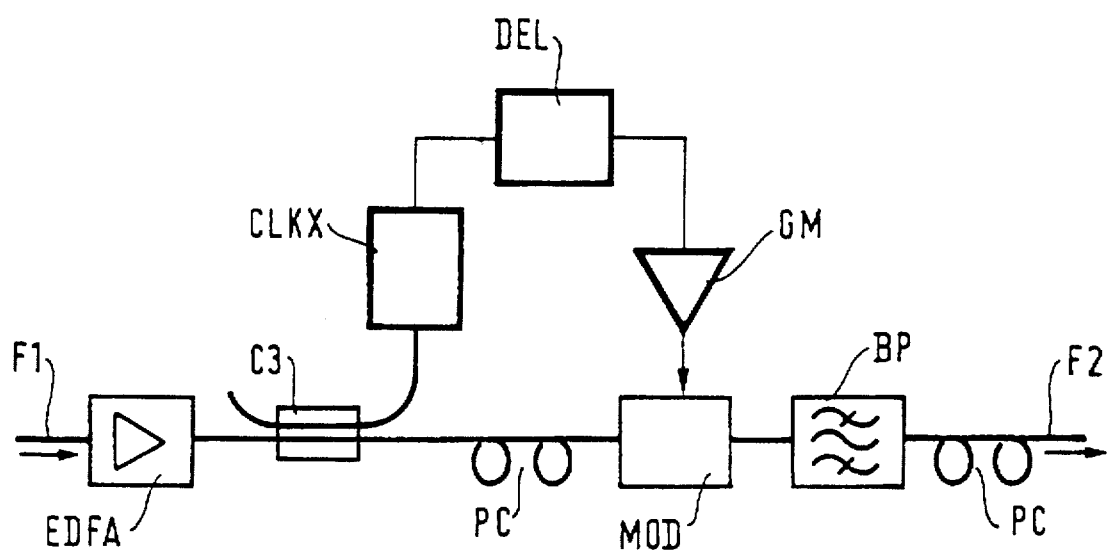
FIG. 1, already described, is a diagrammatic representation of a synchronous soliton modulator device with an opto-electronic clock recovery circuit known from the prior art document D2.
Figure 2:
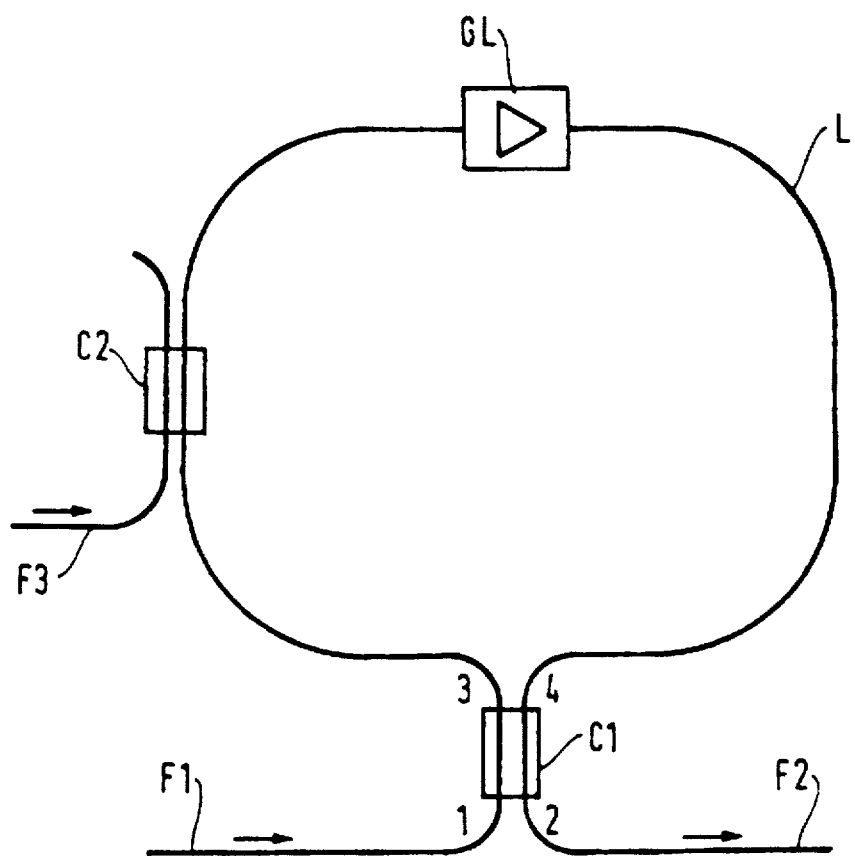
FIG. 2 is a diagrammatic representation of a prior art non-linear optical loop mirror (NOLM) that can be used in the device of the invention.

FIG. 2 is a diagrammatic representation of a prior art non-linear optical loop mirror (NOLM) that can be used in the device of the invention. The NOLM comprises a loop L of optical fiber, a first optical coupler C1 with four poles 1, 2, 3, 4 and a coupling coefficient γ/1−y that defines the division of optical power between the various ports and a second optical coupler C2 for injecting a control signal into the NOLM via the control optical fiber F3.

The optional addition of an optical amplifier GL to the loop can impart a positive gain to the system which turns it into a non-linear amplifying loop mirror (NALM), but a device of this kind is not described further here.

The optical signal to be switched by the NOLM is introduced via the input fiber F1 to the port 1 of the coupler C1. Consider first a 50/50 coupling coefficient of the coupler C1 in the absence of any control signal on the fiber F3. In this case, 50% of the power of said optical signal appears at port 4 and the other 50% at port 3 of the coupler C1, with a relative phase difference between the two of π/2 radians (90°). The two signals therefore propagate in the fiber loop in opposite directions. The length of the loop is in the order of 5 km to 10 km. Since the optical paths of the two signals are identical, the signals arrive at the respective ports 3, 4 of the coupler C1, at which they interfere with each other.

Because the two signals are out of phase by π/2, destructive interference occurs for the resultant wave directed towards the port 2 of the coupler C1 and therefore no signal is transmitted to the output fiber F2. On the other hand, the interference is constructive for the resultant wave directed towards the port 1 of the coupler C1 so that the signal at the port 1 is totally reflected by the mirror NOLM towards the port 1 in this case.

Now consider the case in which a control signal is present on the control optical fiber F3. This signal is coupled into the loop of the NOLM by the optical coupler C2 and propagates in the loop in the clockwise direction. The waves of the signal that are circulating in the loop in the opposite direction are only very slightly affected, if at all, by the presence of a control signal. However, the waves of the signal that are propagating in the same direction in the loop are disturbed. The fiber of the loop L has a non-linear effect such that the refractive index of the fiber is changed according to the optical power, or to be more precise according to the amplitude of the electric field in the fiber (Kerr effect). The electrical fields of the "copropagating" wave are superposed linearly so that the resultant intensity of the electric field is greater than that of the waves circulating in the loop L in the other direction.

The effective refractive index of the loop L seen by the copropagating waves is different from that seen by the contract propagating waves. Their propagation speeds are therefore different. Their arrival times at the coupler C1 are different and the interference between these waves is therefore modified. All or almost all of the optical power is found at the port 2 of the coupler C1 and conveyed to the output optical fiber F2.

Thus the presence of a control signal on the control fiber F3 is capable of commanding switching of the non-linear optical loop mirror, which is transparent in the presence of the control signal and reflective in the absence of a control signal. The switching frequency can be very high, in the order of at least 100 GHz. The insertion of a birefringent element into the loop of the NOLM can invert the switching characteristics so that the mirror is transparent in the absence of the control signal and reflective in the presence of a control signal. In some cases this effect can cause problems of sensitivity to the polarization of the signals in the non-linear operating range of a device of this kind.

The NOLM just described is of the type that can be used in a soliton regenerator device using the method of the invention to double the frequency of a clock signal. A device of this kind will be described in more detail below with reference to FIG. 7.

Figure 3:
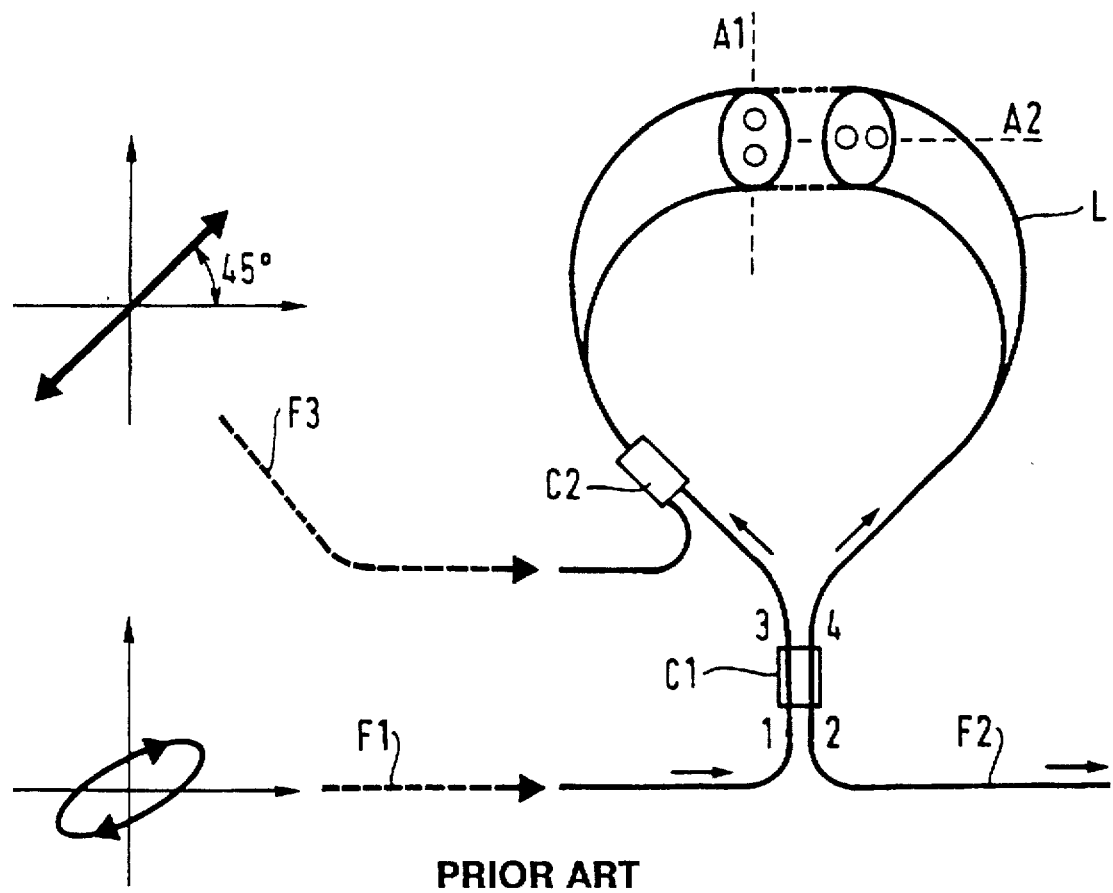
FIG. 3 is a diagrammatic representation of an NOLM switch that is insensitive to the polarization of the signal to be switched from the prior art document D5.
Figure 5:
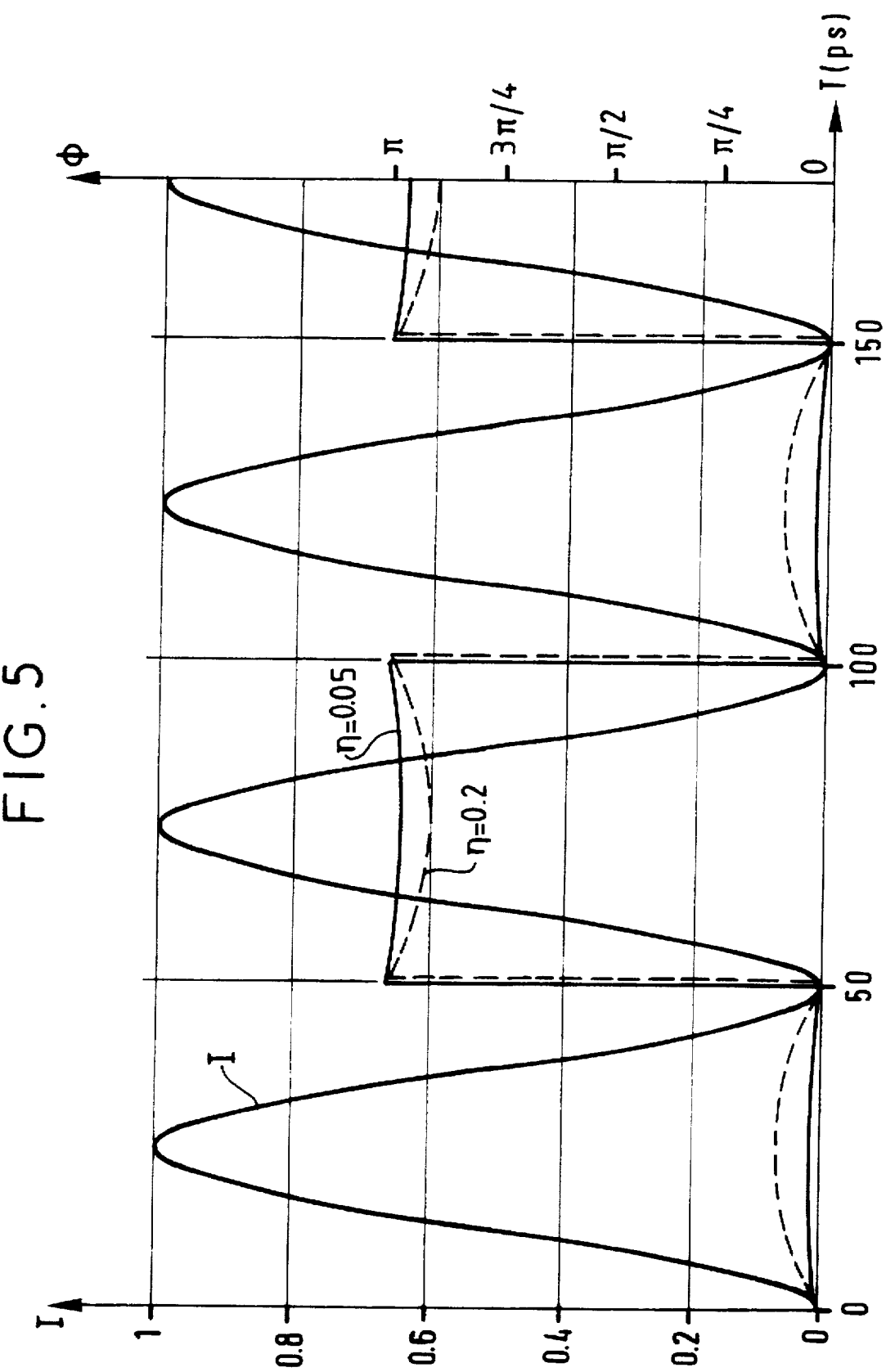
FIG. 5 is a diagrammatic representation of the results obtained with the method of the invention, i.e. the normalized transmittance I and the phase in radians Φ as a function of time for various values of the switching efficiency η.

FIG. 3 is the diagrammatic representation of an NOLM switch that is insensitive to the polarization of the signal to be switched from the prior art document D5=K. Uchiyama et al. (1992) "Ultrafast polarisation-independent all-optical switching using a polarisation diversity scheme in the non-linear optical loop mirror (NOLM)", electron. lett. v.28, N° 20, pp. 1864–1866, 24 Sep. 1992. This document describes the use of an NOLM as a switch that is rendered insensitive to the polarization of the light of the signal to be switched. This is achieved by using a polarization maintaining fiber that is cut and turned 90° at the median point of the NOLM loop. This principle is shown in FIG. 5.

The NOLM loop comprises a PANDA polarization maintaining fiber with two holes, for example. By relative rotation of the axis A1 and the axis A2 by 90° at the mid-point of the propagation path, the fast (respectively slow) axis of the lefthand part becomes the slow (respectively fast) axis of the righthand part of the loop in FIG. 3. The fiber of the loop (L) is polarization dispersive, i.e. the propagation speed of the light inside the fiber is different for a polarization aligned with a fast axis and for a polarization orthogonal to the fast axis of propagation, i.e. the slow axis of the fiber. It is necessary to eliminate the effects of the polarization dispersion, which is achieved by using two identical lengths of fiber having a mutually orthogonal arrangement of the polarization maintaining axes A1, A2, the effect of which is to eliminate the polarization dispersion.

To render the system independent of the polarization of the switched signal, the polarization of the control signal that is introduced into the loop L by the coupler C2 on the control input fiber F3 is injected at 45° to the orthogonal axes A1, A2. In the same manner as previously the effects of polarization dispersion cancel out.

Figure 4:
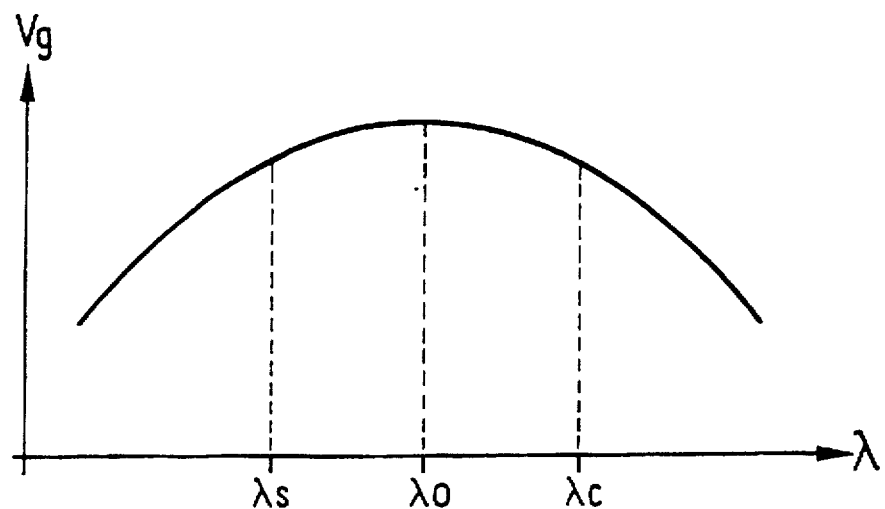
FIG. 4 is a diagrammatic representation of the group velocity as a function of the wavelength of the light propagating in an optical fiber.

FIG. 4 is a diagram showing the group velocity Vg as a function of the wavelength of the light propagating along the fiber in the NOLM. To achieve optimal results using the method of the invention it is advantageous to use wavelengths of the clock signal $\lambda c$ and of the soliton signal $\lambda s$ having the same group velocity. As shown in FIG. 4, this can easily be achieved by choosing two wavelengths on opposite sides of the zero dispersion wavelength $\lambda 0$.

If the group velocity Vg is the same for both wavelengths $\lambda c$ and $\lambda s$, the intensity transmission coefficient of an NOLM is given by the equation:

$$I = \sin^2\left[\frac{\pi}{2} \frac{P_{cc}}{P_\pi} \sin(2\pi f_0 t)\right]$$

If $\eta = P_{cc}/P_\pi < 1$, the intensity transmission coefficient I can be approximated by a sinusoid of frequency $2f_0$.

FIG. 5 is a diagrammatic representation of the results obtained by the method of the invention, i.e. the normalized transmittance I and the modulation phase $\Phi$ (in radians) as a function of time in picoseconds and for various values of the switching efficiency $\eta$. It can be seen that for a control signal and therefore a phase modulation having a period of 100 picoseconds the transmittance resembles a sinusoid having a period of 50 picoseconds. In other words, the transmittance frequency is twice the control frequency. On the other hand, the phase modulation is almost square for a very low value of $\eta$ ($\eta$=0.05) but includes a "chirp" for higher values ($\eta$=0.2).

Figure 6:
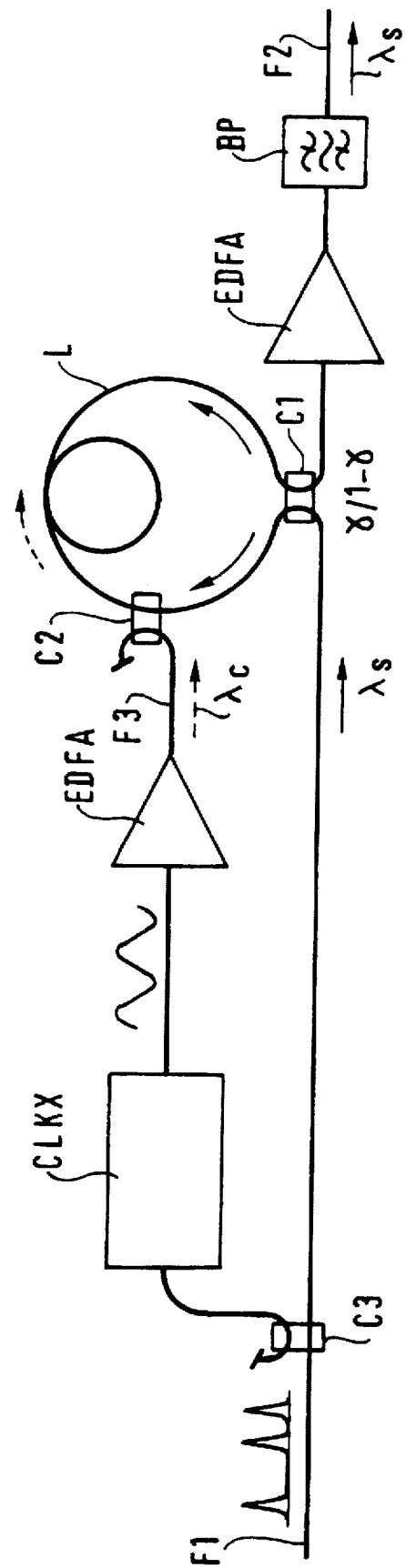
FIG. 6 is a diagrammatic representation of an optical soliton regenerator system using the method of the invention.

FIG. 6 is a diagrammatic representation of an optical system for regenerating solitons using the optical doubling method of the invention.

In the device shown in FIG. 6, the soliton type optical signal to be regenerated, having a bit frequency of $2f_0$, arrives via an input optical fiber F1 from which an optical coupler C3 samples a part of the signal in order to extract a clock signal from it using the clock recovery means CLKX at a sub-harmonic frequency $f_0$. The means CLKX then apply said clock optical signal at a sub-harmonic frequency $f_0$ to the control input of the NOLM via the coupler C2. The soliton signal will still be at the same wavelength $\lambda s$. The wavelength $\lambda c$ of the clock signal will preferably be slightly different from that of the soliton signal $\lambda s$ to enable blocking of the clock at the output of the device by a band-pass filter BP having its pass-band centered on the wavelength $\lambda s$ of the soliton. The wavelengths $\lambda s$ and $\lambda c$ are chosen with the same group velocity, as explained above with reference to FIG. 4.

On the downstream side of the sampling coupler C3, the soliton signal continues to propagate along the input optical fiber F1 as far as the input port 1 of the coupler C1 of the NOLM. In one embodiment of the FIG. 6 device an optical amplifier (EDFA) can be placed on the upstream (or even the downstream) side of the mirror NOLM to compensate the line losses suffered by the soliton since the last time that it was amplified or regenerated.

The operation of the NOLM is similar to that described above with reference to FIG. 2. The solitons arriving at the port 1 of the coupler C1 of the NOLM are modulated by the clock signal applied to the control input F3 via the control coupler C2. The transit times of the clock and of the solitons on their respective paths must be adjusted to enable synchronization of the signals when they circulate in the NOLM.

The soliton signal is thus modulated by the NOLM. The resulting amplitude modulation of the solitons is deemed sufficient to reduce or even eliminate Gordon-Haus jitter at the output of the regenerator device.

FIG. 7 shows the results of digital simulation of the quality factor Q as a function of the link length D over transoceanic distances in the order of 10 000 km for various values of the control power $P_C$, i.e. for various values of the switching efficiency $\eta$. The simulation results show that the lowest values are the most advantageous values in terms of obtaining the best quality Q on long distance links. A curve showing the results for intensity modulation alone is given for comparison.

The FIG. 7 simulation used the following parameters: bit rate 20 Gbit/s, link of D km made up of a plurality of sections of 45 km with optical amplifiers (EDFA) disposed between the section for an overall length of 9 900 km. The fiber attenuation was $\alpha$=0.23 dB/km and the chromatic dispersion of a conventional fiber was D=0.25 ps/nm/km. At each EDFA amplifier the ASE noise was added to the signal and the gain adjusted to obtain a constant power. The signal was a pseudo-random bit signal (PRBS) of 128 bits each of 10 ps encoded as soliton pulses having the standard $\text{sech}^2$ form.

It is preferable to use a polarization maintaining fiber for an optical doubler of the invention as shown in FIG. 3.

already described. The optical clock signal is injected into the NOLM via the coupler C2 with its polarization axis at 45° to the polarization maintaining axes A1, A2 in the loop fiber L. Accordingly, the operation of the device is insensitive to the polarization of the soliton signal to be modulated, which constitutes a major advantage compared with the prior art implementations.

The clock recovery means CLKX can be either all-optical means or opto-electronic means.

The base frequency $f_{sh}$ can be doubled $i$ times by repeating the method of the invention $i$ times. This can be effected in a device comprising a cascade of $i$ NOLMs, with the output signal of the jth NOLM connected to the control input of the (j+1)th NOLM, for all integer values of j and j<i. The frequency $f_s$ at the output of the last NOLM will be:

$$f_s = 2^i f_{sh}$$

The device of the invention has been described with reference to only a few embodiments using prior art devices for the NOLM to recover and supply the clock signal to the control input of the NOLM and to solve a few minor problems that may be encountered in implementing an in-line soliton regenerator system. The list of implementations exploiting the method of the invention is naturally not limiting and the person skilled in the art will be able to adapt the principles of the method of the invention to their own devices according to their own needs.

There is claimed:

1. Method of doubling the frequency $f_0$ of an approximately sinusoidal clock signal conveyed by an optical wave having a first peak-to-peak power $P_{cc}$ and a first wavelength $\lambda c$ to supply a modulated signal at the frequency $2f_0$ conveyed by an optical wave having a second wavelength $\lambda s$, comprising the following steps:

said clock signal at said frequency $f_0$ and having said first wavelength $\lambda c$ is introduced to the control input of a non-linear optical loop mirror, a continuous signal at said second wavelength $\lambda s$ is introduced at the signal input of said non-linear optical loop mirror, and said modulated signal at said frequency $2f_0$ conveyed by an optical wave having said second wavelength $\lambda s$ is collected at the output of said non-linear optical loop mirror, said first and second wavelengths having substantially the same group velocity Vg in said non-linear optical loop mirror NOLM.

2. Method according to claim 1 wherein the value of the peak-to-peak power is made much less than the power of said clock signal required to maximize the switching effect of said non-linear optical loop mirror on said signal.

3. Method of regenerating a soliton signal having a bit rate $f_s$ by synchronous modulation of said solitons at said frequency $f_s$, comprising the following steps:

extracting a sub-harmonic of said soliton signal having a frequency $$f_{sh} = f_s \cdot 2^{-i}$$

where $i$ is a positive integer, optical doubling of said sub-harmonic frequency $f_{sh}$ as recited in claim 1, this step being repeated $i$ times to supply a clock signal at the frequency $f_s$, applying said clock signal at the frequency $f_s$ to the control input of an optical modulator in order to modulate said soliton signal present at the signal input of said modulator, and collecting the soliton signal modulated as above at the output of said modulator.

4. A method according to claim 3 further comprising the steps of amplifying said soliton signal and filtering said soliton signal to eliminate amplified spontaneous emission ("ASE").

5. Method according to claim 3 wherein said sub-harmonic of said soliton signal is extracted optically and converted into an electronic signal before it is applied to said control input of said optical modulator.

6. Method according to claim 3 wherein said sub-harmonic of said soliton signal is extracted optically and is not converted into an electronic signal before it is applied to said control input of said optical modulator.

7. Method of regenerating a soliton signal having a bit rate of $f_s$ by synchronous modulation of said solitons at said frequency $f_s$, comprising the following steps:

extracting a sub-harmonic of said soliton signal having a frequency $$f_{sh} = f_s \cdot 2^{-i}$$

where $i$ is a positive integer, optical doubling of said sub-harmonic frequency $f_{sh}$ as recited in claim 1, this step being repeated $i-1$ times to supply a clock signal at the frequency $f_s/2$, applying said clock signal at the frequency $f_s/2$ to the control input of a non-linear optical loop mirror in order to modulate said soliton signal present at the signal input of said non-linear optical loop mirror ("NOLM"), and collecting the soliton signal modulated as above at the output of said NOLM.

8. A method according to claim 7 further comprising the steps of amplifying said soliton signal and filtering said soliton signal to eliminate amplified spontaneous emission ("ASE").

9. The method as recited in claim 1 wherein said clock signal is derived from said continuous signal.

10. The method as recited in claim 1 wherein said non-linear optical mirror is insensitive to a polarization of said clock signal.

11. The method as recited in claim 1 wherein said group velocity Vg of said clock signal and said continuous signal are the same, and an intensity transmission coefficient I of said non-linear optical mirror is given by the equation:

$$I = \sin^2[(\pi/2)(P_{cc}/P_\pi)(\sin(2\pi f_0 t))].$$

12. The method of doubling the frequency of an approximately sinusoidal clock signal as recited in claim 1 wherein said non-linear optical loop mirror is composed of fibers having a non-linear effect such that a refractive index of said fiber is changed according to an amplitude of an electric field in said fiber.

* * * * *